US012743146B2

(12) United States Patent
Wu et al.

(10) Patent No.: US 12,743,146 B2
(45) Date of Patent: Sep. 22, 2026

(54) METHOD AND SYSTEM OF IMAGE PROCESSING WITH POWER REDUCTION WHILE USING A UNIVERSAL SERIAL BUS CAMERA

(71) Applicant: Intel Corporation, Santa Clara, CA (US)

(72) Inventors: Ko Han Wu, Taipei City (TW); Thiam Wah Loh, Singapore (SG); Kenneth K. Lau, Taipei (TW); Wen-Kuang Yu, Taipei (TW); Ming-Jiun Chang, New Taipei City (TW); Andy Yeh, Taipei City (TW); Wei Chih Chen, New Taipei City (TW)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/898,047

(22) Filed: Aug. 29, 2022

(65) Prior Publication Data

US 2024/0069619 A1 Feb. 29, 2024

(51) Int. Cl.

| | |
|---|---|
| ***G06F 1/3234*** | (2019.01) |
| ***G06F 1/16*** | (2006.01) |
| ***G06T 1/00*** | (2006.01) |
| ***H04N 7/18*** | (2006.01) |
| ***H04N 21/4363*** | (2011.01) |
| ***H04N 23/65*** | (2023.01) |

(52) U.S. Cl.
CPC .......... *G06F 1/3253* (2013.01); *G06F 1/1686* (2013.01); *G06T 1/0007* (2013.01); *H04N 7/183* (2013.01); *H04N 21/43632* (2013.01); *H04N 23/651* (2023.01)

(58) Field of Classification Search
CPC ... G06F 1/3253; G06F 1/1686; H04N 23/651; H04N 7/183; H04N 21/43632; G06T 1/0007
See application file for complete search history.

(56) References Cited

U.S. PATENT DOCUMENTS

| | | | | |
|---|---|---|---|---|
| 2013/0117489 | A1* | 5/2013 | Doshi | G06F 13/20 710/313 |
| 2014/0189409 | A1* | 7/2014 | Jeyaseelan | G06F 13/20 713/324 |
| 2016/0170472 | A1* | 6/2016 | Cosaro | G06F 1/324 710/104 |
| 2017/0353171 | A1* | 12/2017 | Ito | H03H 9/125 |
| 2017/0364401 | A1* | 12/2017 | Huang | G06F 11/0748 |
| 2020/0183565 | A1* | 6/2020 | Cronholm | G06F 1/163 |
| 2021/0103327 | A1* | 4/2021 | Ansari | H04N 21/44004 |
| 2022/0114126 | A1* | 4/2022 | Nelson | G06F 1/3293 |
| 2022/0197367 | A1* | 6/2022 | Kirubakaran | G06F 1/3228 |

* cited by examiner

*Primary Examiner* — Sunghyoun Park
(74) *Attorney, Agent, or Firm* — Hanley, Flight & Zimmerman, LLC

(57) ABSTRACT

A method, system, and article provide image processing with power reduction while using universal serial bus cameras.

20 Claims, 12 Drawing Sheets

100
TIME
Frames 102
Bus side 112
CPU side 122
104
Frame N 6.267ms
No Video Frame 26.125ms 108
106
Frame N+1 6.267ms
No Video Frame 26.125ms 110
1024byte x N DATA1 114
"IDLE" 0-byte IN DATA0 118
1024byte x N DATA1 116
"IDLE" 0-byte IN DATA0 120
DATA-TYPE TRANSMISSIONS 124

|  | Time-Stamp | PACKET | Pkt Dir |  | TYPE | DATA SUMMARY | SIZE |
|---|---|---|---|---|---|---|---|
| ··· | -0 . 000 338 632 | Pkt 27519 | ↑D |  | DATA0 | 1024 byte x N DATA | 1024 bytes |
| ··· | -0 . 000 249 966 | Pkt 27522 | ↑D |  | DATA2 |  | 1024 bytes |
| ··· | -0 . 000 231 900 | Pkt 27524 | ↑D |  | DATA1 |  | 1024 bytes |
| ··· | -0 . 000 213 866 | Pkt 27526 | ↑D |  | DATA0 |  | 1024 bytes |
| ··· | -0 . 000 124 666 | Pkt 27529 | ↑D |  | DATA1 |  | 108 bytes |
| ··· | -0 . 000 106 632 | Pkt 27531 | ↑D |  | DATA0 |  | 0 bytes |
| ··· | 0 . 000 000 000 | Pkt 27536 | ↑D |  | DATA0 | "IDLE" 0 byte x IN DATA0 TRANS-MISSIONS | 0 bytes |
| ··· | 0 . 000 125 000 | Pkt 27539 | ↑D |  | DATA0 |  | 0 bytes |
| ··· | 0 . 000 249 984 | Pkt 27542 | ↑D |  | DATA0 |  | 0 bytes |
| ··· | 0 . 000 234 084 | Pkt 27545 | ↑D |  | DATA0 |  | 0 bytes |
|  | ··· | ··· | ··· |  | ··· |  | ··· |
| ··· | 0 . 026 338 632 | Pkt 28219 | ↑D |  | DATA0 |  | 0 bytes |
| ··· | 0 . 026 250 084 | Pkt 28222 | ↑D |  | DATA0 |  | 0 bytes |
| ··· | 0 . 026 375 084 | Pkt 28225 | ↑D |  | DATA0 |  | 0 bytes |
| ··· | 0 . 026 500 084 | Pkt 28228 | ↑D |  | DATA0 |  | 0 bytes |
| ··· | 0 . 026 623 504 | Pkt 28231 | ↑D |  | DATA2 | 1024 byte x N DATA | 1024 bytes |
| ··· | 0 . 026 643 368 | Pkt 28233 | ↑D |  | DATA1 |  | 1024 bytes |
| ··· | 0 . 026 661 434 | Pkt 28235 | ↑D |  | DATA0 |  | 1024 bytes |
| ··· | 0 . 026 750 100 | Pkt 28238 | ↑D |  | DATA2 |  | 1024 bytes |

202

300
IDLE - INACTIVE STATE
TYPE A USB CAMERA - ACTIVE STATE
50
40
30
20
10
TIME

Figure 7:
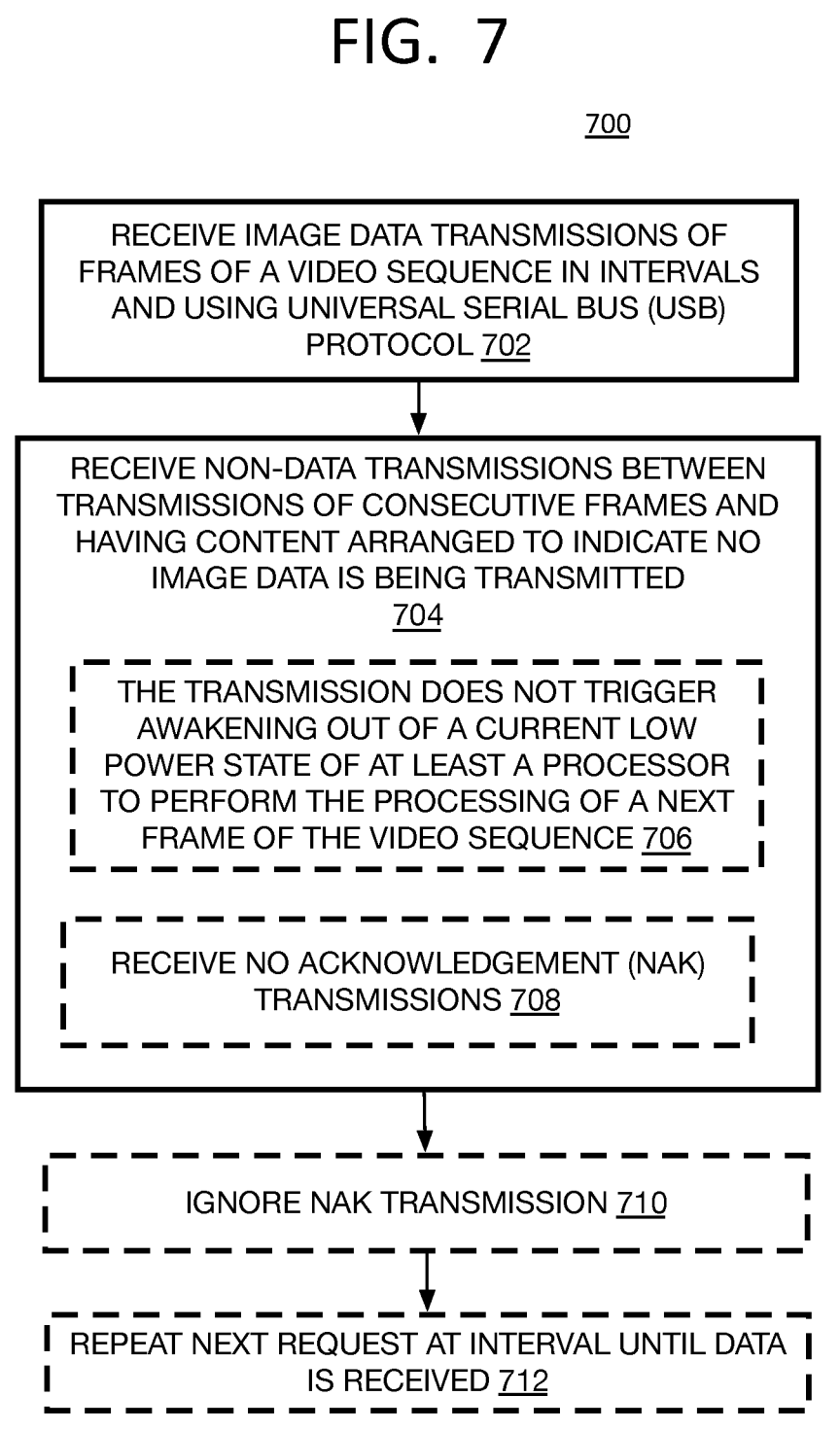

RECEIVE IMAGE DATA TRANSMISSIONS OF FRAMES OF A VIDEO SEQUENCE IN INTERVALS AND USING UNIVERSAL SERIAL BUS (USB) PROTOCOL 702

RECEIVE NON-DATA TRANSMISSIONS BETWEEN TRANSMISSIONS OF CONSECUTIVE FRAMES AND HAVING CONTENT ARRANGED TO INDICATE NO IMAGE DATA IS BEING TRANSMITTED 704

THE TRANSMISSION DOES NOT TRIGGER AWAKENING OUT OF A CURRENT LOW POWER STATE OF AT LEAST A PROCESSOR TO PERFORM THE PROCESSING OF A NEXT FRAME OF THE VIDEO SEQUENCE 706

RECEIVE NO ACKNOWLEDGEMENT (NAK) TRANSMISSIONS 708

IGNORE NAK TRANSMISSION 710

REPEAT NEXT REQUEST AT INTERVAL UNTIL DATA IS RECEIVED 712

900
TIME
Frames 902
Bus Side 912
CPU Side 922
904
Frame N
906
Frame N+1
908 No Video Frame
910 No Video Frame
X byte x N DATA1 914
918 NAK
X byte x N DATA1 916
920 NAK
Interrupts 924
No Interrupts, CPU can enter deeper than PC2R 928
Interrupts 926
No Interrupts, CPU can enter deeper than PC2R 930

|  | Time-Stamp | PACKET | Pkt Dir |  | TYPE | DATA SUMMARY | SIZE |
|---|---|---|---|---|---|---|---|
| ... | -0 . 000 078 466 | Pkt 941 | ↑ D |  | DATA0 | X byte x N DATA | 512 bytes |
| ... | -0 . 000 055 834 | Pkt 945 | ↑ D |  | DATA2 |  | 512 bytes |
| ... | -0 . 000 046 000 | Pkt 948 | ↑ D |  | DATA1 |  | 512 bytes |
| ... | -0 . 000 036 166 | Pkt 951 | ↑ D |  | DATA0 |  | 512 bytes |
| ... | -0 . 000 026 334 | Pkt 954 | ↑ D |  | DATA1 |  | 512 bytes |
| ... | -0 . 000 016 500 | Pkt 957 | ↑ D |  | DATA0 |  | 512 bytes |
| ... | 0 . 000 000 000 | Pkt 960 | ↑ D |  | NAK | "IDLE" 0 byte x IN DATA0 TRANS-MISSIONS |  |
| ... | 0 . 000 020 600 | Pkt 962 | ↑ D |  | NAK |  |  |
| ... | 0 . 000 041 600 | Pkt 964 | ↑ D |  | NAK |  |  |
| ... | 0 . 000 069 066 | Pkt 967 | ↑ D |  | NAK |  |  |
| ... | 0 . 000 089 600 | Pkt 969 | ↑ D |  | NAK |  |  |
| ... | 0 . 000 110 600 | Pkt 971 | ↑ D |  | NAK |  |  |
|  | ... | ... | ... |  | ... |  | ... |
| ... | 0 . 000 425 616 | Pkt 1003 | ↑ D |  | NAK |  |  |
| ... | 0 . 000 446 616 | Pkt 1006 | ↑ D |  | NAK |  |  |
| ... | 0 . 000 467 616 | Pkt 1008 | ↑ D |  | NAK |  |  |
| ... | 0 . 000 488 616 | Pkt 1010 | ↑ D |  | NAK |  |  |
| ... | 0 . 000 509 784 | Pkt 1012 | H ↓ |  |  |  |  |
| ... | 0 . 000 512 400 | Pkt 1014 | ? ? |  | Full Speed J | X byte x N DATA |  |
| ... | 0 . 001 628 534 | Pkt 1015 | ? ? |  | Full speed K (resume) |  |  |
| ... | 0 . 001 819 150 | Pkt 1018 | ↑ D |  | DATA0 |  | 512 bytes |
| ... | 0 . 001 830 816 | Pkt 1021 | ↑ D |  | DATA1 |  | 512 bytes |
| ... | 0 . 001 840 650 | Pkt 1024 | ↑ D |  | DATA0 |  | 512 bytes |
| ... | 0 . 001 850 516 | Pkt 1027 | ↑ D |  | DATA1 |  | 512 bytes |
| ... | 0 . 001 860 350 | Pkt 1030 | ↑ D |  | DATA0 |  | 512 bytes |

FIG. 11

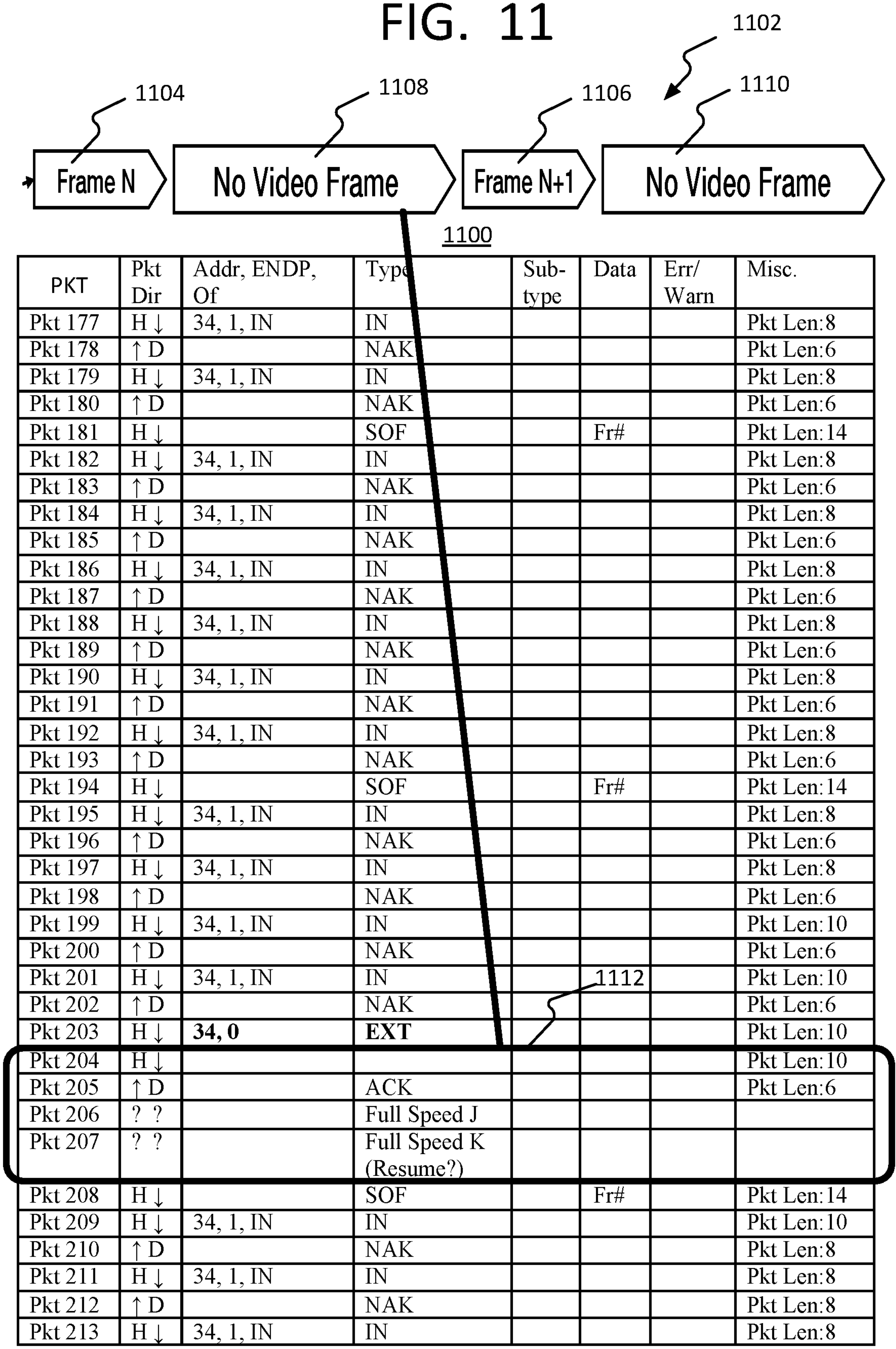

| PKT | Pkt Dir | Addr, ENDP, Of | Type | Sub-type | Data | Err/ Warn | Misc. |
|---|---|---|---|---|---|---|---|
| Pkt 177 | H ↓ | 34, 1, IN | IN | | | | Pkt Len:8 |
| Pkt 178 | ↑ D | | NAK | | | | Pkt Len:6 |
| Pkt 179 | H ↓ | 34, 1, IN | IN | | | | Pkt Len:8 |
| Pkt 180 | ↑ D | | NAK | | | | Pkt Len:6 |
| Pkt 181 | H ↓ | | SOF | | Fr# | | Pkt Len:14 |
| Pkt 182 | H ↓ | 34, 1, IN | IN | | | | Pkt Len:8 |
| Pkt 183 | ↑ D | | NAK | | | | Pkt Len:6 |
| Pkt 184 | H ↓ | 34, 1, IN | IN | | | | Pkt Len:8 |
| Pkt 185 | ↑ D | | NAK | | | | Pkt Len:6 |
| Pkt 186 | H ↓ | 34, 1, IN | IN | | | | Pkt Len:8 |
| Pkt 187 | ↑ D | | NAK | | | | Pkt Len:6 |
| Pkt 188 | H ↓ | 34, 1, IN | IN | | | | Pkt Len:8 |
| Pkt 189 | ↑ D | | NAK | | | | Pkt Len:6 |
| Pkt 190 | H ↓ | 34, 1, IN | IN | | | | Pkt Len:8 |
| Pkt 191 | ↑ D | | NAK | | | | Pkt Len:6 |
| Pkt 192 | H ↓ | 34, 1, IN | IN | | | | Pkt Len:8 |
| Pkt 193 | ↑ D | | NAK | | | | Pkt Len:6 |
| Pkt 194 | H ↓ | | SOF | | Fr# | | Pkt Len:14 |
| Pkt 195 | H ↓ | 34, 1, IN | IN | | | | Pkt Len:8 |
| Pkt 196 | ↑ D | | NAK | | | | Pkt Len:6 |
| Pkt 197 | H ↓ | 34, 1, IN | IN | | | | Pkt Len:8 |
| Pkt 198 | ↑ D | | NAK | | | | Pkt Len:6 |
| Pkt 199 | H ↓ | 34, 1, IN | IN | | | | Pkt Len:10 |
| Pkt 200 | ↑ D | | NAK | | | | Pkt Len:6 |
| Pkt 201 | H ↓ | 34, 1, IN | IN | | | | Pkt Len:10 |
| Pkt 202 | ↑ D | | NAK | | | | Pkt Len:6 |
| Pkt 203 | H ↓ | **34, 0** | **EXT** | | | | Pkt Len:10 |
| Pkt 204 | H ↓ | | | | | | Pkt Len:10 |
| Pkt 205 | ↑ D | | ACK | | | | Pkt Len:6 |
| Pkt 206 | ? ? | | Full Speed J | | | | |
| Pkt 207 | ? ? | | Full Speed K (Resume?) | | | | |
| Pkt 208 | H ↓ | | SOF | | Fr# | | Pkt Len:14 |
| Pkt 209 | H ↓ | 34, 1, IN | IN | | | | Pkt Len:10 |
| Pkt 210 | ↑ D | | NAK | | | | Pkt Len:8 |
| Pkt 211 | H ↓ | 34, 1, IN | IN | | | | Pkt Len:8 |
| Pkt 212 | ↑ D | | NAK | | | | Pkt Len:8 |
| Pkt 213 | H ↓ | 34, 1, IN | IN | | | | Pkt Len:8 |

METHOD AND SYSTEM OF IMAGE PROCESSING WITH POWER REDUCTION WHILE USING A UNIVERSAL SERIAL BUS CAMERA

BACKGROUND

Many different types of universal serial bus (USB) cameras connect to a computing device, such as a laptop, that use a USB protocol. The USB cameras may be external such as webcams that couple to an external USB port on the computing device. Otherwise, internal cameras may be integrated into the body of the computing device and interconnect to processors using USB protocols on internal circuitry pathways. Either way, the USB cameras may be in use while the computing device is in a mobile mode. In a mobile mode, it often becomes important for the computing device to reduce power consumption. Current video streaming with cameras that use USB protocols, however, is often wasteful because such protocols have an isochronous mode that sends data transmissions that wake processors or subsystems of the computing device even when no image data is being transmitted from the camera, thereby consuming too much power.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 is a table showing details of the traffic of FIG. 1 on a protocol analyzer;

FIG. 6 a schematic diagram of an image processing system with a USB camera according to at least one of the implementations herein;

FIG. 7 is a flow chart of a method of image processing with a USB camera according to at least one of the implementations herein;

FIG. 10 is a table showing details of the USB camera data traffic of FIG. 8 on a protocol analyzer according to at least one of the implementations herein;

FIG. 11 is a is a table showing details of the USB camera data traffic on a protocol analyzer when a USB protocol bus is suspended according to at least one of the implementations herein;

DETAILED DESCRIPTION

Figure 1:
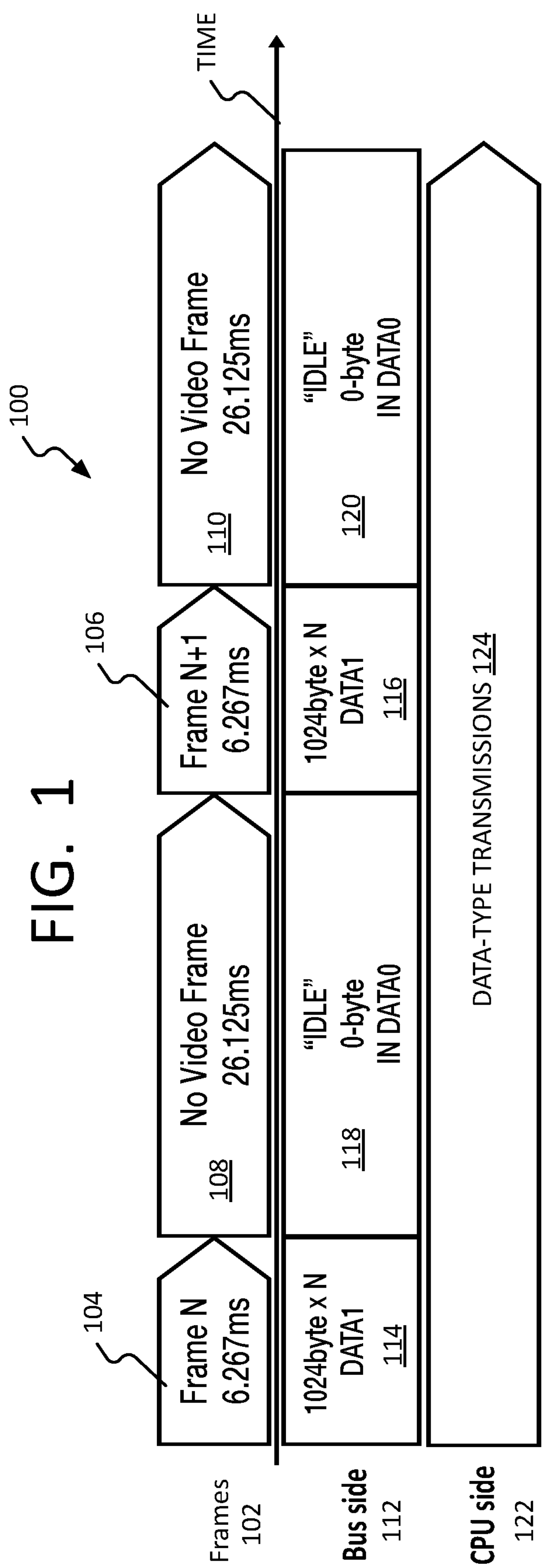
FIG. 1 is a schematic flow-diagram showing data transmissions for conventional USB camera video frame traffic.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes unless stated otherwise. For instance, various architectures employing, for example, multiple integrated circuit (IC) chips and/or packages, and/or various computing devices and/or commercial or consumer electronic (CE) devices such as servers, computers, desktops, laptops, tablets, phablets, smart phones, other smart device, set top boxes, TVs, monitors, and so forth as long as it provides a connection to at least one USB camera and using USB protocol to provide image data to one or more processors. The at least one USB camera may be an external or internal camera device, one or more webcams, camera arrays, helmet, vehicle, or security system camera, internet of things (IoT) camera, virtual reality, augmented reality, or modified reality systems camera, and so forth that may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof unless stated otherwise. The material disclosed herein may also be implemented as instructions stored on a machine-readable medium, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, media, platforms, devices, and methods are described below for image processing with power reduction while using universal serial bus (USB) cameras.

As mentioned above, both built-in, integrated USB cameras on computing devices, such as laptops, and externally connected USB cameras that use video streaming with a USB protocol result in significant unnecessary power drains on a computer system. Specifically, the USB protocol used to transmit image data from the USB camera and to the computing device does not permit the computing device, or subsystems of the computing device, to achieve a deep (or deeper) power state between transmission of consecutive frames in a video sequence to reduce power consumption during video streaming.

Referring to FIG. 1, a conventional video streaming time-flow 100 for a USB 2.0 camera shows the flow of data from the camera to a computing device over time. A frame row 102 shows captured video frames at the camera that are to be sent from the camera to a host on the computing device one frame at a time. Here, consecutive frames 102 and 106 are shown. After an individual frame 104 or 106 has been completely transferred to the computing device, a block of time 108 and 110, respectively, exists between the frames where no image data is being transmitted to the computing device.

Particularly, for conventional USB 2.0 video frame transmission, projected or predicted bandwidth reserved for the video is often 480 Mbps while the actual bandwidth occupied using a typical camera, depending on the resolution of the video, will usually only use a small fraction of the predicted bandwidth, such as 10% (or 48 Mbps). Thus, when a single frame expected duration is 33 milliseconds (for a 30 frames-per-second (fps) frame rate), only 3 milliseconds actually has traffic while the additional 30 milliseconds of the single frame duration is idle. Due to the USB protocol, however, power is still being wasted during this idle time period.

For example, a bus side 112 row in the flow 100 shows corresponding blocks of transmission data 114 and 116 respectively of the two frames 104 and 106 being transmitted from a USB camera, and then on one or more USB protocol buses to a USB host and/or processors of the computing device. However, during the blocks of time 108 and 110 between consecutive frames when the camera capture operations are in an idle state, the bus side 112 still shows that the camera is transmitting idle 0-byte DATA0 packets in idle blocks 118 or 120 anyway. These transmissions are being sent to the computing device according to USB 1.0 or 2.0 isochronous mode, and even though these packets do not have image data. For the USB isochronous mode, a USB host controller continuously transmits data requests on time intervals, even between frame transmissions, and awaits a response from the camera for each request. A response is provided for every request. If the camera has video frame or image data, the camera will provide the payload and an acknowledgement. If, however, no payload exists, a negative acknowledgement can be given. Whether or not a negative acknowledgement is provided, the conventional response is the transmission of empty DATA0 packets even if there are no data available. The host will continue to use the allocated isochronous time slot to perform the transfer (host request to device) until the allocated time is exhausted. This continuous streaming between frame transmissions is represented by a CPU row or side 122 labeled data-type continuous streaming 124 for the computing device and that shows the continued receipt of packets with and without image data. The receipt of the 0-byte DATA0 packets at the USB host controller triggers interrupts at the processors performing the image processing at the computing device and of image data received from the camera. By one form, this video stream maintains interrupts every 125 microseconds, which wakes up CPUs of the computing device and prevents deep-sleep low power states.

Referring to FIG. 2 for more detail, a protocol analyzer table 200 shows communication between a USB camera and a host controller on a computing device, and is obtained by monitoring USB protocol bus traffic between the host controller and USB device. The time-stamp column shows a time stamp of each transmission, here with approximately 40 microseconds between each transmission. The remaining columns include a transmission packet number column, a transmission direction column where D and up arrow refers to uploading from the camera and to the host controller, transmission or packet type column where DATA0 and DATA1 are packets that transmit image data, and DATA2 refers to a high speed data packet. A data summary column (not shown by the actual analyzer itself) provides annotations for FIG. 2 to show the amount of data being transmitted by multiple packets for a single frame or for the time between frames, and a size column shows the byte size of the individual packets. The table 200 shows that a section or duration 202 between frames when the camera is idle still is transmitting DATA0 packets with 0 bytes of image data to the host controller at the computing device. This establishes a continuous stream of data transfer from the USB camera to the USB host that does not stop between frames as shown by continuous transmissions 122 (FIG. 1), thereby preventing the CPU and other processors as well other subsystems such as memory and the host controller itself on the computing device from establishing very deep (deeper sleep) low power states.

As to the low power states at the processors of the computing device, when certain systems lack activity for a predetermined duration, a number of sub-systems on an SoC can enter self-started low power states that save significant power and that includes savings on a bus interface electrical signaling, and so forth. On certain architecture, CPU power states are labeled as core c-state (CCN) from CC0, which is an active state, to CC6, and a low power state on the SoC level is referred to as a package c-state PCN which can be from PC0 to PC8 by one example. The package lower power state PCN is determined depending on a combination of low power states of the subsystems of an SoC, by one example. The higher the number of the PCN or CCN lower power state, the higher the power savings.

Figure 3:
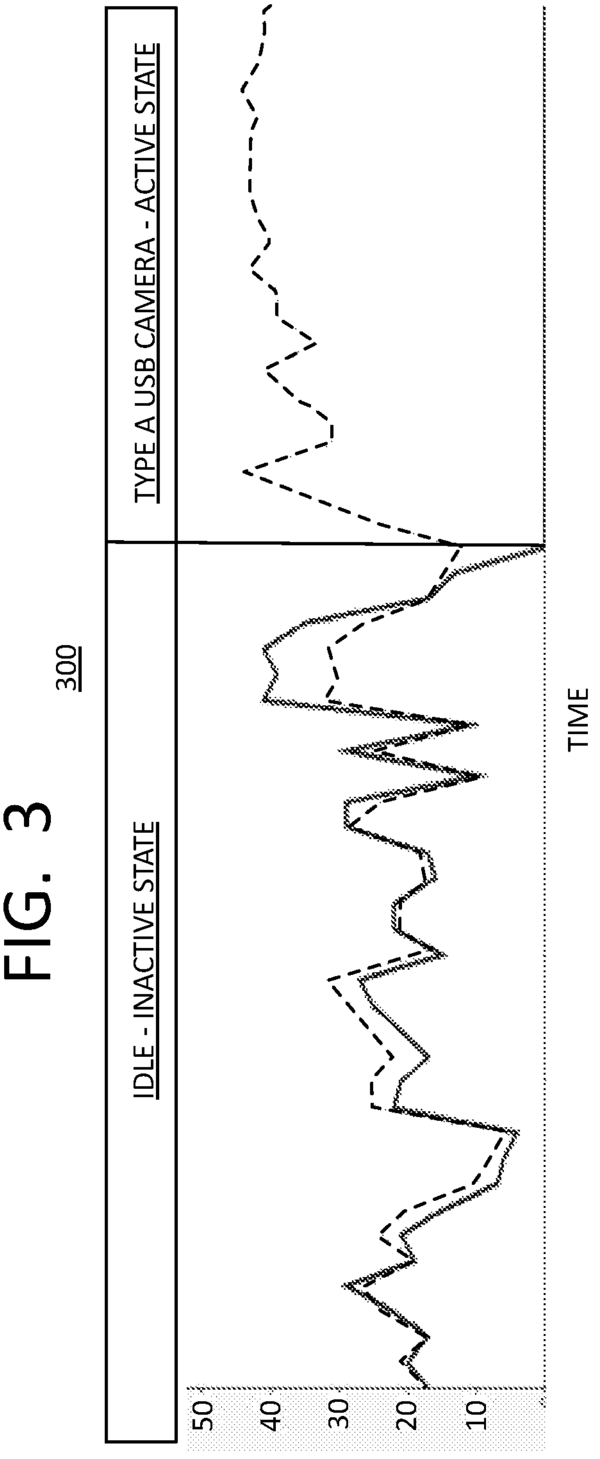
FIG. 3 is a graph showing power states of a conventional system operating a USB camera.

Referring to FIG. 3, a graph 300 plots time versus a percentage of power state residency in PC2 and PC3 to show which low power states were achieved while a USB camera was and was not active. The dark solid line indicates a package low power c-state three (or PC3) and the dashed line indicates a lower power state of PC2. PC3 is a deeper low power state than PC2. The idle duration 302 is a relatively long idle duration before or after the capture of a start of a video sequence of frames or after the end of a video sequence of frames when no frames are being transmitted to a computing device at all (much longer than the idle duration between consecutive frames during transmission of a video sequence). In this case, deep low power states, deeper than PC2, can be attained such as PC3 shown on the graph during the inactive state (idle). During the active state, while image data of frames are being transmitted to the computing device, the USB data packet transmission cannot be turned off between consecutive frames as explained above. Thus, the deepest lower power state that can be achieved is PC2.

Also, SoCs are particularly vulnerable to a power drain. SoCs use independently controlled, multiple subsystem level dynamic power states. This may include changes to voltage levels, clock frequency, clock gating, power gating, and other functions that can be independent from sub-system to sub-system on the same SoC. Thus, each subsystem may have a different low level power state contributing to a whole SoC (or domain or package) level PCN power state. Regardless of the independence of the subsystems in the SoC power arrangement, however, dependencies still exist between the subsystems. Thus, when one sub-system is consuming power, this may affect the power consumption of an entire SoC since the sub-system uses common or shared resources such as an interconnect, power rails, etc., as well as the entire computing device.

To resolve these issues, the disclosed image processing system and method modifies USB protocol operations in order to reduce power consumption at a computing device that receives frames of a video sequence from a USB camera, and specifically by reducing power consumption between receipt of consecutive frames of the video sequence. To accomplish this, the disclosed system has a USB camera transmit a non-data transmission in response to a request from a USB host controller on the computing device instead of transmitting a data transmission with zero bits of image data, despite the USB 1.0 and 2.0 transmission specifications. It was determined that by transmitting a non-data no acknowledge (NAK) signal (or transmission or packet) instead of the zero-data transmission, the host controller would not react to initiate an interrupt, thereby permitting processors, subsystems, and even buses on the computing device to maintain deeper sleep or low power states (or modes). A NAK transmission was previously used as a handshake message of 'data packet not accepted, retransmit data' when some error occurs, not as an indicator of no data to send from the camera to the computing device.

This solution suppresses unnecessary data transfer from the USB camera to a USB host (or host control or controller) between a frame N and frame N+1. This allows an SoC to enter deeper sleep such as up to PC8 rather than merely PC2, thereby performing a very larger reduction in power consumption, which was found to save 2-3 Watts during video conferencing for example. The increased duration of low power states enables the use of USB suspends and USB selective suspends, further decreasing power consumption. Otherwise, the amount of necessary external memory accesses are reduced as well (since interrupt handling and processing are not being performed), and in turn, less memory area and memory bandwidth may be used. The disclosed solution also can be easily scaled for different random memory read patterns.

Figure 4:
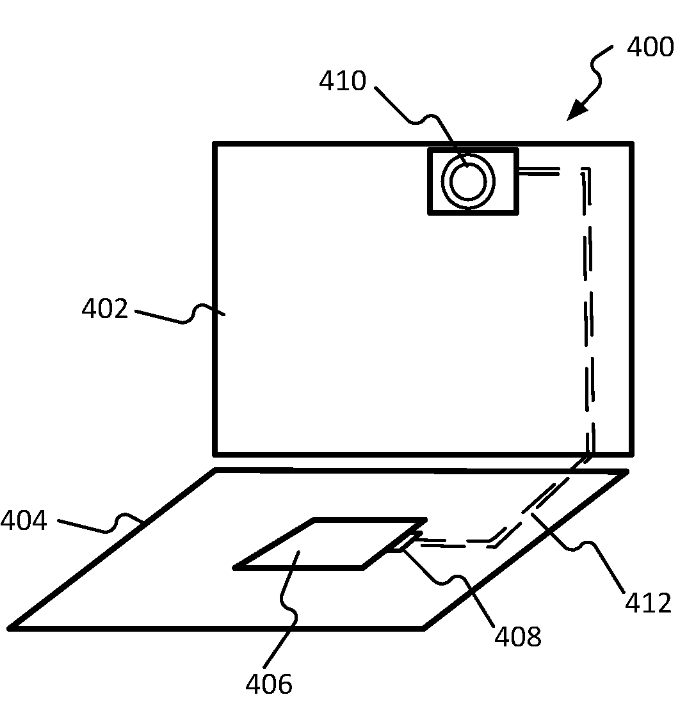
FIG. 4 is a schematic diagram of a front perspective view of a computing device with an internal USB camera according to at least one of the implementations herein.

Referring to FIG. 4 for one example internal image capturing device arrangement, a processing system 400 may be or have a laptop with a display panel 402 hinged to a base 404. The base 404 may have a keyboard, ports, and shown here, one or more processing circuits (or circuitry) 406, which may include one or more motherboards, host boards, printed circuit boards (PCBs), packages, one or more processing chips and other components, or SoCs attached to a mother board for example. The processing circuitry 406 may include a USB host controller as well to control USB traffic, or the host controller may be located elsewhere on the device 400. Many variations are provided below. The panel 402 may have circuitry disposed between a display screen and a cover. In this example, one or more internal USB cameras 410 may be disposed within the panel 402 (and is shown enlarged relative to the size of the device 400 for clarity here). The cameras 410 may have one or more lenses facing a user using the device 400 (as shown), and/or may face the opposite or any other desired direction. The camera 410 may have internal wiring (or lines or pathways) 412 into the base 404 and coupled to an internal USB port 408, and in turn coupled to the processor(s) 406. The internal camera(s) 410 may have many different and varying positions on the device 400 including on the base. The internal USB port 408 may be placed in any desired position within the device 400.

Figure 5:
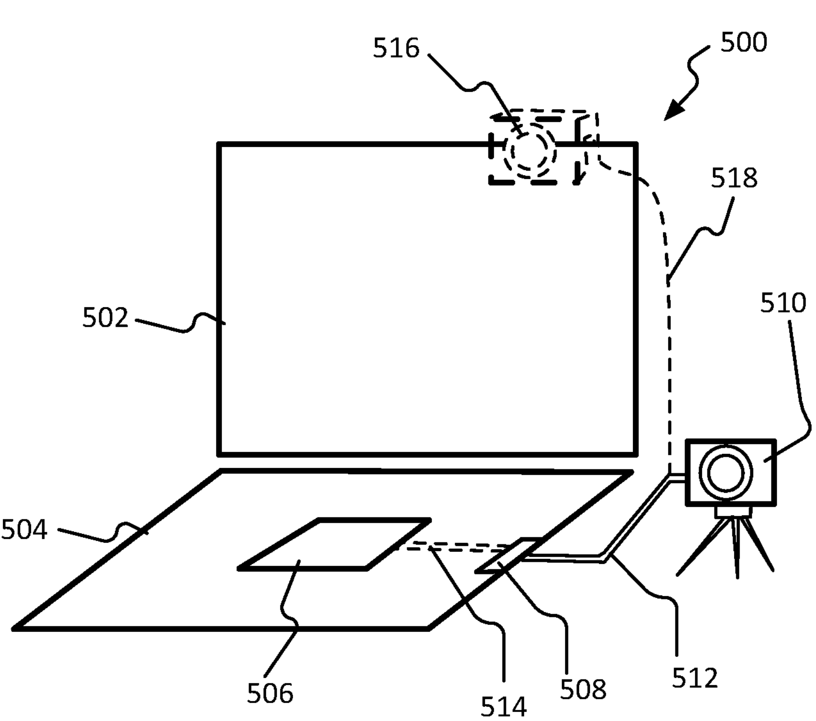
FIG. 5 is a schematic diagram of a front perspective view of a computing device with an external USB camera according to at least one of the implementations herein.

Referring to FIG. 5, an example external image capturing device arrangement includes a processing system 500 that may be, or have, a laptop with a display panel 502 hinged to a base 504. The base 504 may have a keyboard, ports, and shown here, one or more processing circuits (or circuitry) 506 as describe above with processing circuitry 406. Many variations are provided below. The panel 502 may have circuitry between a display screen and a cover. In this example, one or more external USB cameras 510 may be placed externally to the device 500, and may be near or relatively far from the device, as long as the camera 510 has external cords or wires 512 to couple to an external USB port 508 of the device 500. A USB protocol bus or other circuitry 514 may couple the port 508 to the processing circuitry 506. An external camera 516 may be physically mounted on the panel 502 (such as by a vise arrangement) or otherwise attached to, mounted on, or supported by the device 500. In this case, the camera 516 may have cords or wires 518 coupled to the external USB port 508 as well. Here to, the cameras 516 and 510 may have one or more lenses to face a user using the device 500 (as shown), and/or may face the opposite or any other desired direction.

By one alternative form, the internal or external cameras may communicate wirelessly with the processing circuitry 406 or 506, such as by Bluetooth® transceiver or by other arrangements. In such an example, a wireless transceiver may provide the received image data to a USB internal port or directly to a USB host controller that operates according to USB protocol including an isochronous mode. In the case, wireless communication can be used to handle NAK transmissions inside hardware and that avoids a wakeup of a CPU to process an interrupt. Other details are provided below.

While the camera 410, 510, or 516 may be particularly suited for certain tasks, such as video conferencing, the cameras may be provided for any desired wavelength (whether for capturing optical or visible light, or for non-visible wavelengths such as infra-red (IR), near infra-red (NIR), and so forth). The camera is not particularly limited as long as a USB protocol with an isochronous mode is available. Other details of these cameras are provided below.

Figure 6:
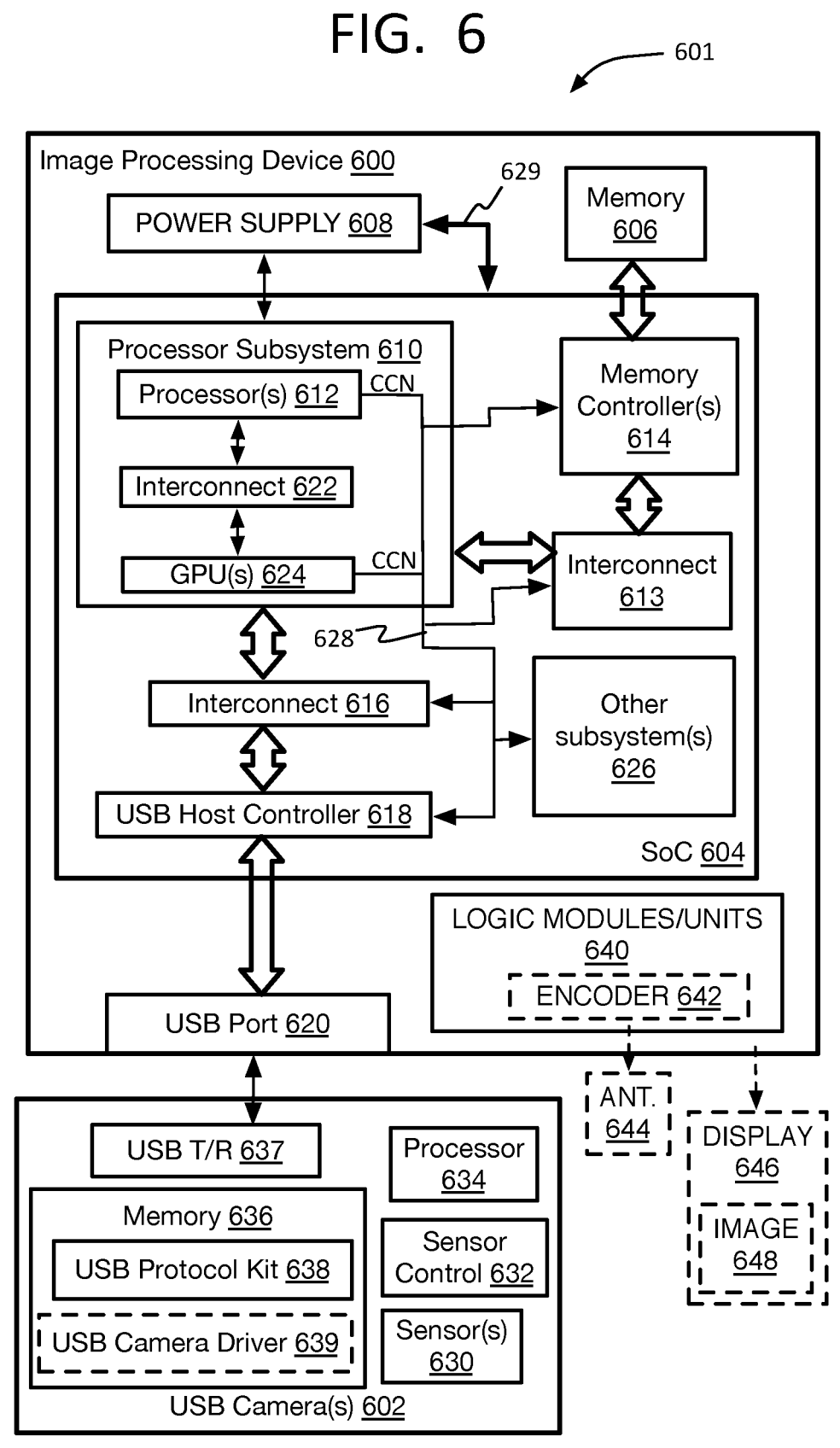

Referring to FIG. 6, an image processing (or computing) device 600 is part of an image processing system 601 arranged in accordance with at least some implementations of the present disclosure. The device 600 may be any of a number of general-use computing devices including a laptop, smartphone, or any other computing device including those mentioned above, and that couples to an external or internal separate camera 602. Otherwise, device 600 may be a specific-purpose or specific-function device such as one or more video cameras, and in this case, the camera 602 is an image capture sub-system with the circuitry and components specifically or mainly provided to capture images. In the illustrated form, the device 600 may connect to at least one camera (or camera sub-system) 602 using any USB protocol version. Also, while the present disclosure is directed to isochronous traffic types for cameras, such USB device could be other than a camera to use the NAK for indication of no data transfer from the USB device. Going forward, it will be assumed that camera 602 is a separate, distinct camera and that computing device 600 is not limited to any one single specific type of computing device.

The USB imaging device or camera 602, shown here, is coupled to a USB port 620 for external connection to the computing device 600, although USB camera 602 could be an internal camera as described above. Thus, camera 602 may be any form of commercial or consumer video camera including webcams, streaming cameras, camcorders, digital cameras, digital single-lens reflex (DSLR) video cameras, mirrorless cameras, point-and-shoot cameras, professional-grade film cameras, wide, fisheye, or spherical lens cameras, visible or non-visible light (such as NIR) cameras, and so forth.

In one example form, camera 602 may include camera hardware and optics including one or more sensors 630 as well as sensor controls (or module) 632 to control the sensors 630 including 3A controls (auto-focus, auto-exposure, and/or automatic white balance controls), zoom, aperture, ND-filter, flash, actuator controls, and so forth. Any part or all of the controls 632 may be formed of hardware, software, and/or firmware on the camera (or on a camera memory 636), and/or may be part of the logical modules 640 on the computing device 600 or both. Such sensor controls 632 can be used to generate images for a video to be transmitted to the computing device 600. The camera 602 also may have one or more lenses as part of the sensors 630 or arrangement thereof, an image sensor with a RGB Bayer color filter, an analog amplifier, an A/D converter, other components to convert incident light into a digital signal, the like, and/or combinations thereof.

Other forms include a camera sensor-type imaging device or the like (for example, a webcam or webcam sensor or other complementary metal-oxide-semiconductor-type image sensor (CMOS) or a charge-coupled device-type image sensor (CCD)), without the use of a red-green-blue (RGB) depth camera. In other examples, an RGB-Depth camera might be used in addition to or in the alternative to a camera sensor. In some examples, imaging device 602 may be provided with an eye tracking camera.

The sensor 630 may generate a digital signal which also may be referred to as raw image data herein. Under the control of at least one camera processor 634, the image data, whether modified or not, may be provided to a camera USB wired transceiver 637 to transmit the image data to the computing device 600. The image data and non-data transmissions from the camera 602 and to the computing device 600 may be performed according to the USB protocol. The camera processor 634 may read a USB protocol kit 638 that lists USB protocol parameters and settings as well as a USB camera driver 639 that may list other camera parameters and specifications, such as expected bandwidth to reserve on the computing device 600. The USB protocol kit 638 and driver 639 may be stored on the camera memory 636 and/or at least partly on memory or storage holding the logic modules 640 on the computing device 600.

The computing device 600 may have circuitry in the form of a system on a chip (SoC) 604 as one possible arrangement of the processing circuitry but could be other than an SoC as well such as a motherboard with one or more processor chips (or chiplets) or cores. The thick arrows on system 601 show image and instruction data transmission circuitry, pathways, or signals, while the thinner arrows of circuits 628 and 629 are for power control as explained below. The SoC 604 may have a processor subsystem 610 coupled to interconnects through a main bus (not shown). One interconnect 616 may be a USB input/output (I/O) bus that couples the processor subsystem 610 to a USB host control (or controller) 618 formed by host controller circuitry. The USB host controller 618 is coupled to the USB port 620. Also, the processor subsystem 610 may be coupled through a memory interconnect 613 to a memory controller 614. The memory controller 614 may be coupled to memory 606. The interconnect 613 may be a USB memory bus. Other subsystems 626 (which may be referred to as lower activities) also may be coupled, via one or more interconnects (not shown), to the processor subsystem 610 and may include one or more processors, accelerators, and L1 or L2 cache. The processor subsystem 610 also may be coupled to a power supply unit 608 that provides power to the SoC 604, and where circuitry of the power supply unit 608 as well as the processor subsystem is coupled to a power gating circuit or similar circuitry 628 to independently control power being provided to individual subsystems over a power circuit 629 so that each subsystem can be set in a different low power state (or mode) than other subsystems on the SoC 604. The details of power circuit 629 are not shown for clarity.

Also, it will be appreciated that any USB device, including a USB host controller, USB protocol bus, USB camera, and so forth refers to a device that at least complies with the USB protocol specifications relevant to the methods disclosed herein such that the device uses image data transmissions with some type of zero-data messages and NAK type messages, even though such device may not completely comply with all other USB protocol specifications and parameters.

The processor subsystem 610 has processor circuitry that forms one or more processors 612 such as at least one central processing unit (CPU) or CPU cluster, and that may include a number of cores. This may include the Intel® Atom®. Also in the illustrated form, the processor subsystem 610 may have processor circuitry that forms one or more dedicated graphics processing units (GPUs) or image signal processors (ISPs)) 624 coupled to the CPUs 612 by an interconnect 622 such as a processor subsystem bus.

The power supply unit 608 may include circuitry and components so that the image processing device 600 can run on an internal power supply, such as one or more batteries, and by one option, can be recharged and powered by coupling to an external power supply, such as an AC power supply. Thus, the power supply unit 608 may include supply circuitry that may have the battery, ports for connection to an external power supply or circuitry from shared data and power ports, such as a USB port, AC/DC convertors, and other power supply circuitry such as drain power voltage (VDD) lines, ground lines, and so forth, Also, the power supply unit 608 may be coupled to any power circuitry 629 providing power to any of the components of the device 600 including to the SoC 604 and its subsystems collectively or individually.

The power control circuit 628 also may be coupled to the power circuitry 629 and any one or more of the subsystems shown to perform power gating and other power control tasks in order to control the power state of each of the components, subsystems, or groups thereof. By the example here, the processors 612 and 624 may be controlled to maintain a low power state CCN (of CC1 to CC6) for example, while the memory control 614 and memory 608 may be a subsystem with a controlled low power state, as well as the host controller 618 itself and other subsystems 626. The device 600 also may control the power state of buses 613, 616, and 622 independently (or the buses may self-monitor their power level) as described below.

The USB host controller 618 has circuitry to control the flow of data back and forth from the camera 602. The USB host controller may generate transmission packets and initiate the transmissions to the camera 602 through the USB port 620, and receive transmissions from the USB port 620, determine the content of the transmissions, and initiate appropriate action depending on the content, and all in compliance with a USB or similar protocol. Thus, when image data is transferred in data transmissions (even with a zero bit image data transmission) to the host controller 618, the host controller 618 notifies the processor subsystem and has the image data saved in memory or storage so that the processors can further process the image data as needed, such as by performing pre-processing and preparing the images for display or further encoding and transfer to another device. Conventionally, this caused an interrupt of the low power states of the processor subsystem between consecutive frames, and possibly waking of the entire package with the SoC 604 or entire device 600. Otherwise, here for the disclosed system and method, when a non-data transmission is received such as a NAK between frames of a video sequence as described herein, the host controller 618 knows to simply wait for a next interval without initiating an interrupt to the processor or other subsystems or components on the device 600. The details are explained below.

It will be appreciated that with some options, the host controller 618 may be formed by, or part of, the processor subsystem 610, rather than being a separate unit with separate dedicated circuitry, and may be a simulated host controller formed by processor circuitry, other hardware, firmware and/or software. This may depend on SoC partition architecture.

For the USB port 620, the term port here refers to a general sense and can be an interface with either a male or female structure (or both). The USB port 620 may have a physical architecture of any type of USB port that complies with USB protocols including any of USB A, B, C, mini, micro, or lightening connector configurations, or any other USB configuration or even non-USB configuration as long as the data transmission is in compliance with USB protocol or similar protocol modes that require transmission at intervals even between transmission of image data of consecutive frames of a video sequence. The USB port 620 also may have any number of camera-related parameter controls such as exposure, white balance, mechanical movement of the camera, and so forth. The connection between the USB port 620 and USB transceiver 637 on the camera 602 may be by one or more cords or cables extending from the camera 602 and with connection ends arranged to fit together with the USB port 620.

By one form, the connection between the USB transceiver 637 and USB port 620 may be wireless. In this case, a wireless transceiver 637 and port 620 (which here would also be a wireless transceiver) each may have antennas and controls for direct transmission between them, or a Bluetooth® system on the two devices may communicate and provide the image data to the host controller 618 over a USB protocol bus from a Bluetooth® unit (not shown) to the USB host controller 618 instead of port 620.

The memory 606 may be dynamic random access memory (DRAM), many other types of RAM, cache, and other types of volatile memory. The device 600 also may have non-volatile storage (not shown here) such as that described below. The images, camera driver, instructions, any relevant image-related applications, protocol specifications including USB protocol, and so forth may be stored in the memory 606 or other storage as needed.

Other optional components on the device 600 may be software or firmware in the logic units 640 including an encoder (and/or decoder) 642 in order to re-transmit the image data to another device via an antenna 644. The encoder may include any pre-processing or treatment applications to modify the image data as needed before transmission. The device 600 also may include one or more displays 646 to display an image 648 obtained from the camera 602 as well as the display controls (not shown) to perform the display. In one example implementation, the image processing system 601 may have the display 648, processor circuitry 610 forming at least one processor 612 communicatively coupled to the display, at least one memory 606 communicatively coupled to the processor 612, and a host controller 620 coupled to the at least one processor 612.

As illustrated, any of these components may be capable of communication with one another and/or communication with portions of the processor subsystem 610, logic modules 640, and/or imaging device(s) 602. Thus, processor circuitry 610 may be communicatively coupled to both the imaging device 602 and the logic modules 640 for operating those components. By one approach, although image processing system 601, as shown in FIG. 6, may include one particular set of blocks or actions associated with particular modules, these blocks or actions may be associated with different modules than the particular module illustrated here. The operation of system 601 is described below with process 700.

Referring to FIG. 7, an example process 700 of image processing with power reduction while using a USB camera is described herein. In the illustrated implementation, process 700 may include one or more operations, functions, or actions as illustrated by one or more of operations 702 to 712, numbered evenly. By way of non-limiting example, process 700 may be described herein with reference to example image processing systems or devices of FIGS. 4-6 and 12-13, where relevant.

Process 700 applies when the USB host control is in an isochronous mode where the host controller is transmitting a request for data to a sensed USB camera connected to the USB port and at set intervals. By one example, the intervals are at every 125 milliseconds, although other intervals can be used, set by a clock (CLK) used by the host controller and that may be a main clock used by the SoC. The interval duration may be setup when a USB Camera driver is read or loaded onto the computing device. The driver may provide the amount of bandwidth that should be used to transmit the video sequence, and the host controller (or processors) may use this amount to compute the appropriate interval that can efficiently handle the transmission of the video sequence.

The requests at the intervals are issued regardless of the status of the transmission and receipt of the image data of frames of the video sequence being transmitted from the USB camera. Thus, the requests are issued at the intervals during an idle period between two consecutive frames of the video sequence as described above. The requests are in the form of a packet addressed to a single USB device using a corresponding address of the USB device asked to provide the data that is read by the processor or other USB control at the USB camera.

Process 700 may include "receive image data transmissions of frames of a video sequence in intervals and using universal serial bus (USB) protocol" 702. Thus, the camera may be capturing a video sequence and transmitting the video sequence to the computing device via a USB cord and through the USB port (or wirelessly as mentioned above), and to the host controller. No limit exists to the type or format of the images being provided including resolution, frame rate, content of the image, and so forth, as long as the image data is compatible with USB protocol.

Process 700 may include "receive non-data transmissions between transmissions of consecutive frames and having content arranged to indicate no image data is being transmitted" 704. Specifically, process 700 may include "the transmission does not trigger awakening out of a current low power state of at least a processor to perform the processing of a next frame of the video sequence" 706. This operation recognizes that the various components of the computing device may be in various current low power states while the video sequence is being transmitted and particularly in the idle duration between transmission of consecutive frames from the USB camera.

In more detail, computing devices can have many different low power levels or states, and a complex SoC can have hundreds of different low power states. Most of the components, processors, and SoC subsystems can enter low power states independently of other components or subsystems on the same SoC, motherboard or host board, package, and so forth, and where different conditions need to be satisfied to enter a particular low power state. Despite the differences in the specific conditions needed to enter a particular low power state for a specific component, the process of entering the low power state is generally similar for one or more criteria. For instance, many circuits predict and decide when to enter a lower power state by measuring the duration that specific conditions exist in an idle state so far. When the conditions have a sufficiently long duration, the targeted low power state may be entered, and the indicated components' circuits are powered down.

So, for example, a low power state may be determined in hardware for each idle clock interval, where certain idle triggers are checked for each available low power state for a subsystem or component, and when all such triggers are satisfied for a certain low power state, the component or subsystem is placed into the lowest power state with satisfied triggers. As mentioned, when one of the triggers is the duration of the idle so far (where no image data is being received), an assumption can be made as to the type of idle depending on the duration of the idle so far. Thus, when the idle is over a certain length, and when other indicators show an end of a frame was received but a start of a next frame has not been received, it can be concluded the current time point is between consecutive frames of the video sequence at a certain bandwidth and frame rate. In this case, the long idle permits the deeper low power states that require a greater amount of time to awaken from those deeper states. The subsystem, component, USB protocol bus itself, the main processors (CPUs, etc.) of the SoC, and so forth may perform their own low power state trigger determinations.

A summary of the available low power states is as follows. A processor subsystem on an SoC, motherboard or host board, or other computing platform, may determine a long idle is taking place and place itself in a certain low power state (CCN) where CC0 is active and the low power depths or levels are CC1 to CC6. Each level deeper (with a higher number) shuts down more features or components of that processor or subsystem. For example, the higher or shallower power states may simply reduce the level of voltage and clock speed being used while the deeper states may turn off the power completely. Other features that are turned off or reduced for the deeper levels are the clock, voltage level, or complete power gating of circuit blocks.

When placing the memory controller and memory (such as DRAM) into a low power state, may force the memory controller to exit a power savings mode for memory fetches; essentially the longer the idle duration of memory access activities; the deeper the sleep the memory and the corresponding subsystem will enter. In other subsystems, internal SoC bus interconnects, IP blocks, or IO pins can be turned off or be placed in a reduced power consumption mode.

Also as mentioned, the USB host controller itself can be placed in a low power state between reception of consecutive frames. As with the other subsystems and buses, when it is detected that an idle time period reaches a certain direction, the USB host controller may enter a reduced low power state, and by one form, as long as request transmissions can still be sent at the pre-set intervals.

Regarding a bus suspend, and as mentioned above, once the bus is idle for a sufficient duration, the bus can enter a power saving state, and this may result in stopping all traffic on the bus. With the use of the NAK transmissions that avoid waking the SoC subsystems, a bus can enter into a bus suspend since the idle period was so prolonged electrically. For example, a bus suspend can be entered when the bus idle duration is longer as decided by the operating system, which is still much shorter than the time between consecutive frames such as 30 milliseconds. Also as mentioned, the power states of different subsystems, components, and so forth normally are not synchronized to each other. Thus, an SoC entering a sleep mode is not necessarily synchronized to a USB protocol bus entering a bus suspend. Thus, it is possible for the USB protocol bus to enter deep low power state modes without depending on the SoC entering deep sleep as well. See FIG. 11 below that shows an example protocol analyzer table with a bus suspend.

Additionally, a selective bus suspend can be used when a detected idle duration is sufficiently long, such as at least about tens of millisecond provided for a selective bus suspend when the NAK transmissions are being used. This response from the USB camera may permit SoC to enter a very prolong sleep period, such as up to 30 milliseconds for a 720p resolution video image at 30 fps. Particularly, a USB protocol bus selective suspend is possible when the idle period is more than a USB standard entry latency of 3 microseconds plus an exit latency of 20 microseconds, which is much shorter than the 30 milliseconds.

A package (or SoC or other architecture) low power state can be achieved depending on a combination of the components and/or subsystems mentioned above, and such as low power states PC0 TO PC8 described above.

By one form, once an end of a previous frame has been received and processed, any of the components, SoC, subsystems, and so forth may enter any of the low power states mentioned above, or may have already entered a low power state due to other conditions not related to being in a time point that is between the receipt and processing of consecutive frames.

It is at this time point, when the subsystems, components, and so forth are in these low power states or sleep modes, that process 700 may include "receive no acknowledgement (NAK) transmissions" 708. To generate the NAK packets at the camera, this involves a change to the USB protocol instructions to provide the NAK transmission or message rather than a data message that would trigger an interrupt to the processors of the computing device. Thus, as shown in pseudo code below in the USB protocol kit residing at the USB camera, the USB protocol code can be modified as follows:

Changed Pseudo Code

```
Device_ Isochronous_InterruptHandler( ) {
    if( there is no_data) {
      send_to_host_NAK( )
    }
.....
}
```

It should be noted that the NAK transmissions may be transmitted from the camera between each consecutive pair of frames in a video sequence. By other approaches, this is a NAK power savings mode that is performed only when the mode is activated, which may be manual as a setup parameter or automatically when the system detects certain conditions, such as large power consumption, and so forth. By other alternatives, the NAK power savings mode may be activated for less than all consecutive pairs of frames along the video sequence, and may be used at intervals of frame pairs, or some other predetermined sequence of frame pairs along the video, such as to achieve a target power savings amount for example. By yet other examples, the NAK is only used for this purpose between consecutive frames, and used for its prior purposes during a single frame transmission. By another form, the NAK may be used for its prior purposes as well at any time and regardless of frame transmission time periods.

This does not require any other change to the USB protocol at the host controller. Thus, process 700 may include "ignore NAK transmission" 710. Specifically, in the USB protocol isochronous transfer mode, the host controller sends request transmissions according to the predetermined schedule or intervals, and cannot substantially deviate from the schedule on its own. The request transmissions may be triggered by hardware such that the host controller is given a fixed time slot for the request transmission and, by one form, the message is limited to an allocated bandwidth. Thus, the host controller cannot actually respond to the NAK transmissions from the camera, and from the perspective of the host controller, there is no re-try to obtain data upon receiving the NAK. Instead, the host controller ignores the NAK message and simply moves on to send the next request at the predetermined interval (or schedule).

An example hardware arrangement to have the host controller transmit requests at the intervals may include having circuitry form the logic elements at the host controller (or other component on the SoC) that generates the packet messages according to a clock and includes an address of the device and corresponding traffic types.

Since the host controller already has hardware-based instructions to ignore the NAK messages, or specifically, that no reaction is needed in response to receiving the NAK message, the host controller can handle the NAK independently of the processors on the computing device instead of using software events that could awaken the SoC or its subsystems.

Process 700 may include "repeat next request at intervals until data is received" 712. Here, the hardware-based requests are repeated, and while receiving the NAK signals, and by one form, until a start of a next frame is indicated, or an end of a video sequence is indicated.

Figure 8:
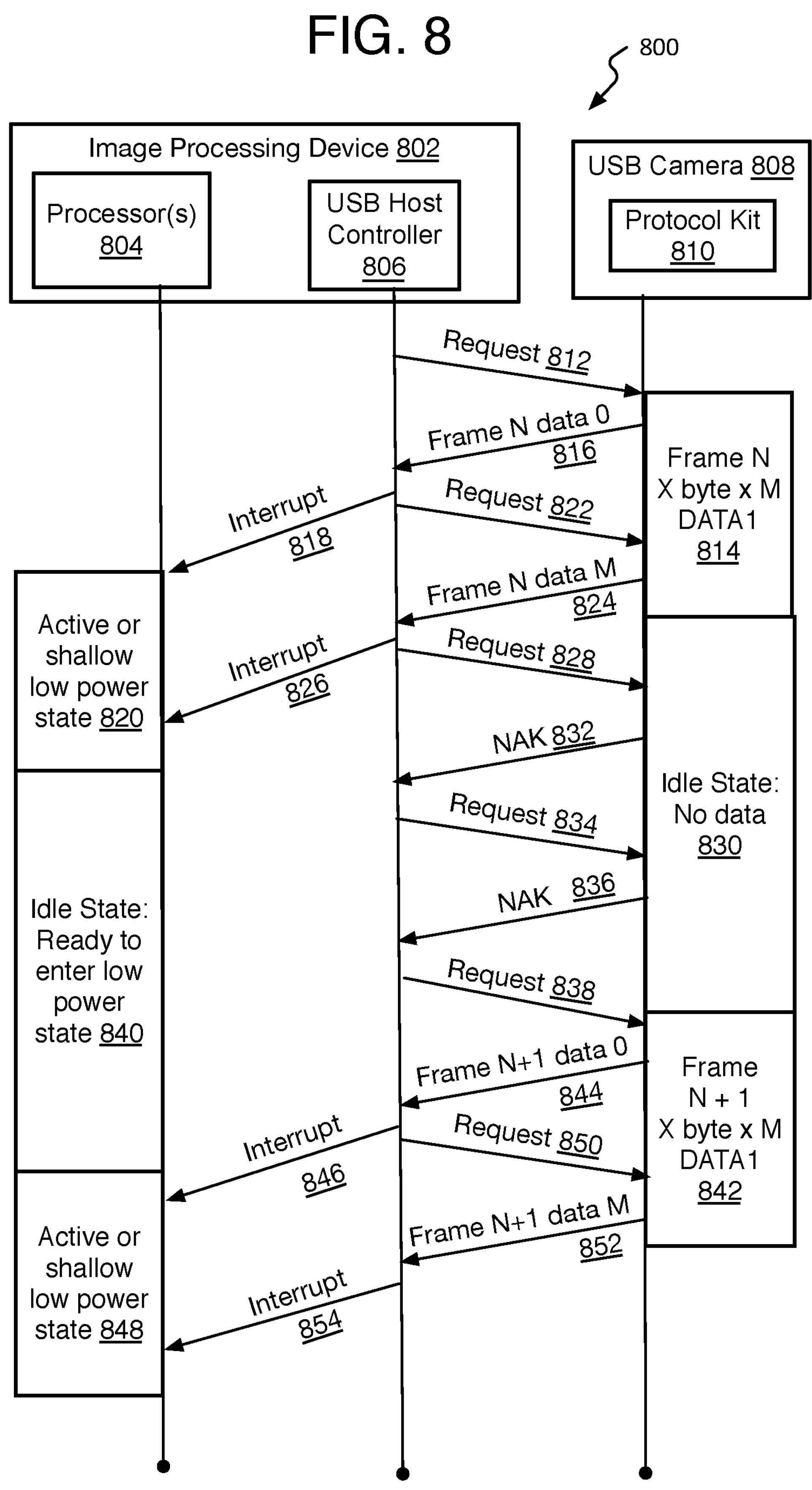
FIG. 8 is a schematic flow-diagram showing data transmissions for USB camera video frame traffic according to at least one of the implementations herein.

Referring to FIG. 8, a flow diagram 800 shows operation of an image processing system and provides details of the host controller operations including transmitting the data requests to the camera, receiving NAK transmissions from a camera in between frames, and activating interrupt signals to awaken processors, subsystems, and other components of the computing device while frames are being received. Specifically, an image processing device 802 may have a processor 804 such as any of the processors or processing packages or chips, such as an SoC with a processor subsystem, or any other processor mentioned herein, and a USB host controller 806. A USB camera 808 communicates with the host controller 806.

In operation, the USB host controller 806 first generates and transmits request transmissions or packets 812 and 822 at predetermined intervals as described above. In response, the USB camera 808 alternately transmits data packets (frame N data 0 to M 816 and 824) when the camera 808 has captured frame image data (Frame N X byte×M DATA1 for example) to be provided to the USB host controller 806. After the host controller 806 receives the frame data, the host controller 806 generates interrupts 818 and 826 which may awaken the processor 804 to an active state or more shallow low power state 820 so that the processor 804 can process the image data.

Once the USB camera shifts to an idle state with no image data between frames at state 830, the camera 808 replies to requests 828 and 834 from the USB host controller 806 with NAK transmissions 832 and 836 respectively, and according to the modified protocol kit 810 as described above so that the host controller will ignore the NAK transmissions rather than generate interrupts. As a result, the idle state 840 is maintained and undisturbed (or at least not awakened to a higher low power state or active state) solely due to the interrupts so that the processor(s), subsystems, and buses can be ready to enter, or be maintained in, deep low power states 848 as described above as well.

When the next consecutive frame (N+1) image data state 842 is available for DATA1 transmissions from the camera 808 to the USB host controller 806, the operations 812 to 826 from the previous fame N are repeated with operations 838 to 854, and interrupts 846 and 854 are generated by the host controller 806 to place (or maintain) the processor 804 in the active state or more shallow low power states to process the frame N+1. The process then keeps repeating with alternating between frame transmissions and NAK transmissions between frame transmissions until the video sequence transmission from the camera to the processor is complete.

Figure 9:
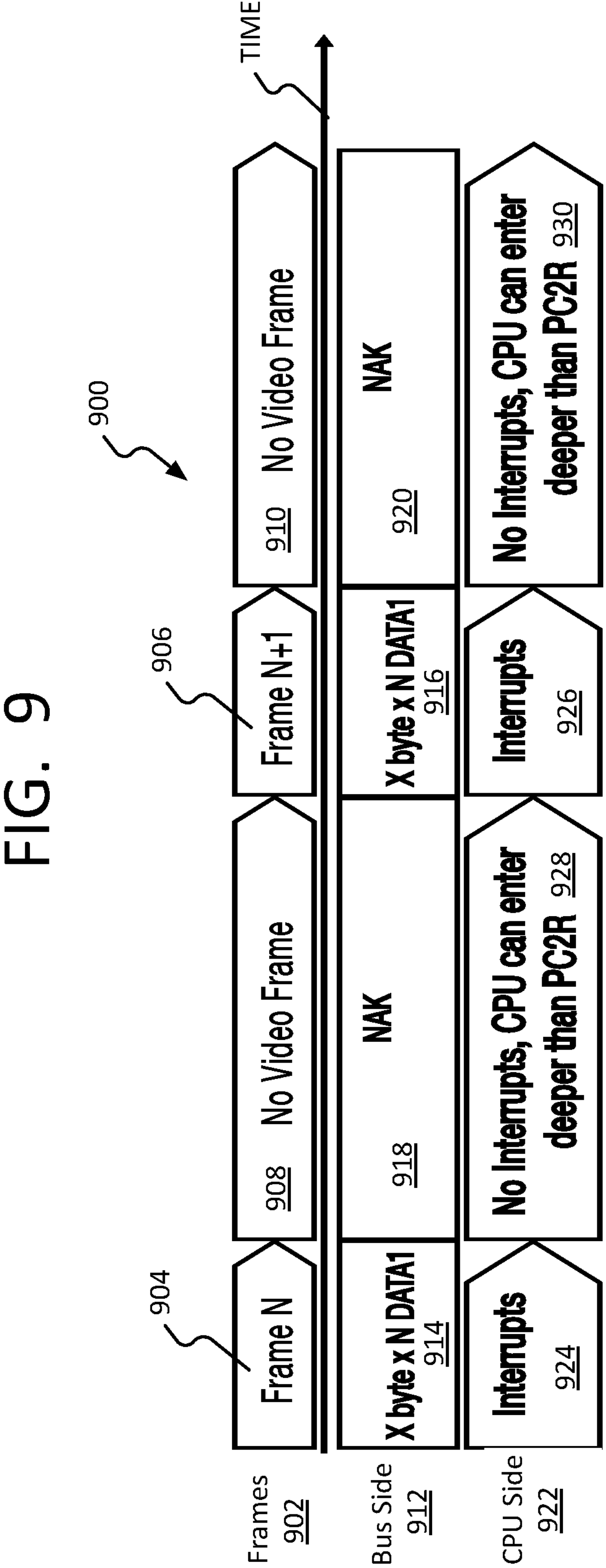
FIG. 9 is another schematic flow diagram showing data transmissions for USB camera video frame traffic according to at least one of the implementations herein.

Referring to FIG. 9, an example of a resulting video streaming time-flow 900 for a USB 2.0 camera has a frame row 902, a bus side row 912, and a CPU side row 922. The frame row 902 has the duration for consecutive frames N 904 and N+1 906, as well as durations with no video frame 908 and 910 each respectively after a frame duration 904 or 906. The bus side row 912 shows transmission during the frame durations 904 and 906, and specifically where each frame 904 or 906 has a respective X byte×N DATA1 transmission 914 or 916 to show that X bytes of image data for a frame N or N+1 is being transmitted on a bus on the computing device. The idle periods 918 and 920 between the frames are shown as receiving non-data NAK transmissions instead of data transmissions as described above. The CPU side row 922 shows interrupts 924 and 926 being issued by the host controller and received by the CPU processors while a frame is being received and processed. In between consecutive frames, however, durations 928 and 930 have no interrupts and the CPUs can enter deeper low power states, and by one form, deeper than PC2R, where R stands for ring off, which corresponds to processor interconnects for xPU processors (for example, CPU, GPU, VPU, etc.).

Referring to FIG. 10, a resulting protocol analyzer table 1000 shows a USB protocol bus capture of communication of transmissions between the USB camera and a host controller at the computing device. As mentioned above, the information for the table is obtained by monitoring a USB protocol bus between the host controller and USB Camera. A time-stamp column shows a time stamp of each transmission, here with approximately 20 microseconds between each transmission. The remaining columns include a transmission packet number column, a transmission direction column where D and up arrow refers to uploading from the camera and to the host controller, or an H and down arrow refers to downloading from the host controller to the camera, transmission or packet type column where DATA0 and DATA1 are packets that transmit image data, DATA2 refers to a high speed data packet, and a NAK packet is as described above. A data summary column (not shown by the actual analyzer itself) provides annotations for table 1000 to show the amount of data being transmitted by multiple packets for a single frame or for the time between frames, and a size column shows the byte size of the individual packets. The table 1000 shows that a section or duration 1002 between frames when the camera is idle, the host controller is receiving non-data NAK packets form the camera. Thus, no stream of data packets is being received at the USB host controller so that no interrupts are being generated, and the processors and other components and subsystems of the computing device can remain or enter in a current deep low power state or may even be placed in a deeper (sleep) low power state.

Packets 1012 to 1015 on table 1000 show the system awakening and transitioning for the start of a new frame where the host controller transmits a request for data to the camera on Pkt 1012, and Pkt 1014 shows no transmissions (as indicated by the question marks) and that the USB protocol bus is in an idle state (as indicated by full speed J). In the next line, full speed K indicates the USB protocol bus is active again. In this case, the bus is idle when other subsystems have no data to transmit. The USB protocol bus here was not intentionally suspended, which is the case in the following example.

Referring to FIG. 11, a time-flow diagram 1102 is shown with a protocol analyzer table 1100 that lists a USB protocol bus transmission capture when a bus is suspended while using the non-data transmissions for controlling low power states between consecutive frames N 1104 and N+1 1106. Here, during durations 1108 and 1110 between (or after) frames 1104 and 1106, a USB or other type of bus itself is suspended or powered down to a low power state (or turned off) so that the bus cannot be used for data transmission and does not waste power. The bus may be any one or all of the buses mentioned above or others with, or establishing, interconnects between the USB host controller and processor subsystem, between the processor subsystem and the memory control, between the memory control and the host control, and any other bus on the processing device that can be suspended.

The table 1100 shows columns, in order from left to right, of packet (number), packet direction, and packet type as described above with tables 200 and 1000. Here, however, it is worth mentioning this table 1100 adds a column for an address endpoint of frame (addr. ENDP Of), and at Misc. to list a packet length in bytes. The table 1100 shows alternating entries of IN and NAK in between transmission of consecutive frames, where IN is a host to device (camera) transfer that is the request for data from the USB host controller to the camera (in other words, a request for something to be provided from the camera and 'IN' to the host). The response to the request, as described above, is the NAK packet received from the camera and at the host controller.

After a certain period of time within the no video frame duration 1108, an EXT, protocol extension token packet (Pkt 203), is transmitted to the camera in order to signal entry into bus suspensions. Thereafter, entries Pkt 204 to Pkt 207 indicate a suspended USB protocol bus (idle at full speed J). When an entire bus is powered down by the operations mentioned above, by one form, the bus cannot be used for any data or signal transmission. Then, the inquiry at the bus as to idle duration and awakening of the bus (to active) is indicated by at full speed K (resume) at Pkt 207 for a start of a frame (SOF) at Pkt 208.

As shown on protocol analyzer 1100, the bus suspend mode may be entered when a longer period of idle (i.e., no data transmissions) exists. In this case, the bus will attempt to shut down the electrical link, which may include removing power from transmissions lines and having no current flow between electrical nodes forming the bus. When the bus is restarted for transmissions, the bus may take a longer time to begin transmissions than without the low power state. When timed correctly, this should not cause delays since the time period between frames (such as 30 milliseconds as mentioned above) is much longer than the enter and exit times needed for the bus suspend (such as 23 microseconds).

By another alternative, the system may perform selective bus suspend at least partly based on receiving the NAK transmissions to maintain other components in a low power state. Specifically, a USB selective suspend feature may allow a hub driver (or here USB host controller) to suspend individual ports without affecting the operation of the other ports on the hub in order to save power. Thus, one or more ports may be suspended (or put into a low power state), and that may be less than all ports on a USB or other bus. Ports may receive power in order to perform data format conversions among other tasks so that two subsystems can communicate for example. This is different from independent control of subsystems on an SoC because the selective bus suspend merely powers down the port providing a data communication pathway rather than components of the end-subsystems that perform certain tasks (such as the processor or memory control). The different ports may be suspended if the ports are not a shared required resource that must remain awake for other awake subsystems or modules. In this case, the selective bus suspend may be performed in a number of different ways. By one example, idle request I/O request packets (IRPs) are used and depending on the operating system and whether a device is composite or non-composite.

While implementation of the example processes 700 and flow diagrams 800 and 900 discussed herein may include the undertaking of all operations shown in the order illustrated, the present disclosure is not limited in this regard and, in various examples, implementation of the example processes herein may include only a subset of the operations shown, operations performed in a different order than illustrated, or additional or less operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality. Component herein also may refer to processors and other specific hardware devices.

The terms "circuit" or "circuitry," as used in any implementation herein, may comprise or form, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor ("processor circuitry") and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other implementations may be implemented as software executed by a programmable control device. In such cases, the terms "circuit" or "circuitry" are intended to include a combination of software and hardware such as a programmable control device or a processor capable of executing the software. As described herein, various implementations may be implemented using hardware elements, software elements, or any combination thereof that form the circuits, circuitry, processor circuitry. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Figure 12:
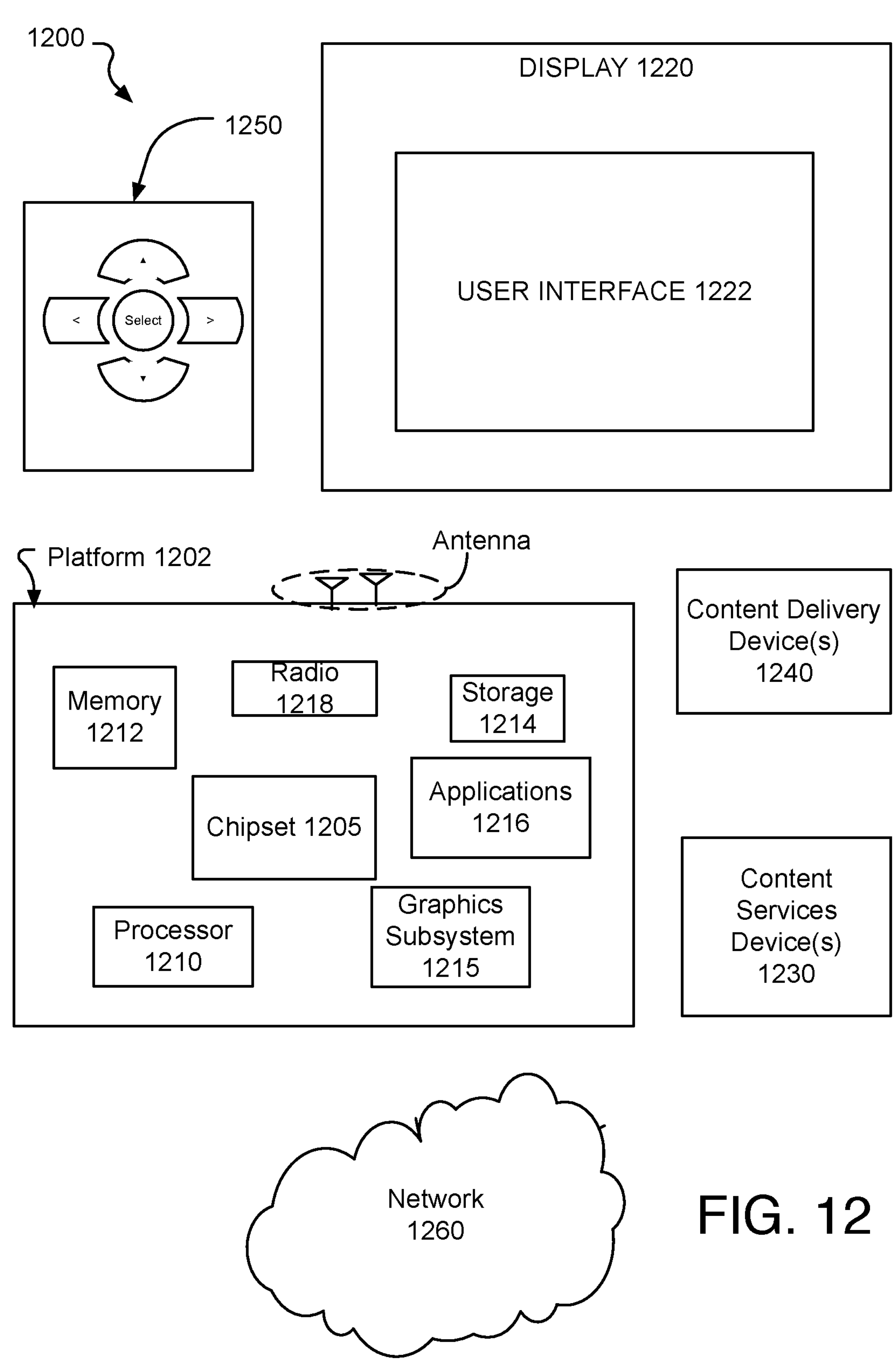
FIG. 12 is a schematic diagram of another example system.

Referring to FIG. 12, an example system 1200 in accordance with the present disclosure operates one or more aspects of the image processing system described herein including system 601 described above, and including one or more USB cameras, and/or a device remote from, and coupled to, the camera that performs the image processing described herein. It will be understood from the nature of the system components described below that such components may be associated with, or used to operate, certain part or parts of the image processing system described above. In various implementations, system 1200 may be a media system although system 1200 is not limited to this context. For example, system 1200 may be incorporated into, or remotely coupled to, a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. It will be appreciated that the system 1200 may have any of these devices with a USB host controller connected via a USB port to a USB camera, or such devices that are similar, and that each may operate according to USB protocol.

In various implementations, system 1200 includes a platform 1202 coupled to a display 1220. Platform 1202 may receive content from a content device such as content services device(s) 1230 or content delivery device(s) 1240 or other similar content sources. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface (HDMI), display port, wireless HDMI, and/or wireless HD compliant techniques. Graphics subsystem 1215 may be integrated into processor 1210 or chipset 1205. In some implementations, graphics subsystem 1215 may be a stand-alone card communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor, and/or a dedicated SoC. In further implementations, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of unidirectionally or bidirectionally communicating content between content providers and platform 1202 and/display 1220, via network 1260 or directly. It will be appreciated that the content may be communicated unidirectionally and/or bidirectionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of controller 1250 may be used to interact with user interface 1222, for example. In implementations, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In implementations, controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 8.1 surround sound audio and/or high definition (12.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various implementations, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various implementations, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 12.

Figure 13:
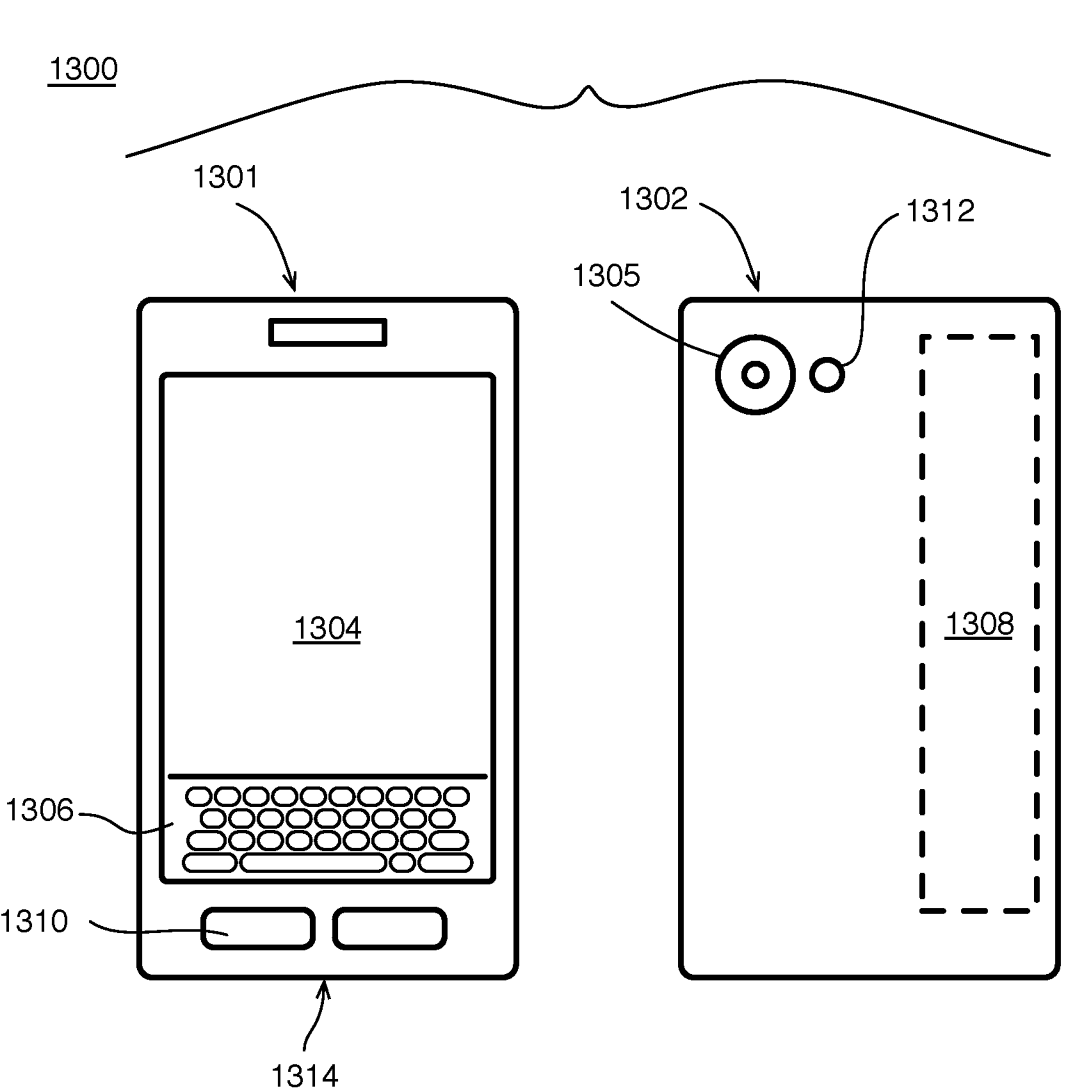
FIG. 13 is a schematic diagram of another example system, all arranged in accordance with at least some implementations of the present disclosure.

As described above, system 601 or 1200 may be embodied in varying physical styles or form factors. FIG. 13 illustrates an example small form factor device 1300, arranged in accordance with at least some implementations of the present disclosure. In some examples, system 601 or 1200 may be implemented via device 1300. In various implementations, for example, device 1300 may be implemented as a mobile computing device having wireless capabilities, and may have a USB connection and port with a USB host controller (whether actual or simulated) as described above. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computer, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 13, device 1300 may include a housing with a front 1301 and a back 1302. Device 1300 includes a display 1304, an input/output (I/O) device 1306, and an integrated antenna 1308. Device 1300 also may include navigation features 1310. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone (not shown), or may be digitized by a voice recognition device. As shown, device 1300 may include one or more cameras 1305 (e.g., including a lens, an aperture, and an imaging sensor) and a flash 1312 integrated into back 1302 (or elsewhere) of device 1300. In other examples, camera 1305 and flash 1312 may be integrated into front 1301 of device 1300 or both front and back cameras may be provided. Camera 1305 and flash 1312 may be components of a camera module to originate image data processed into streaming video that is output to display 1304 and/or communicated remotely from device 1300 via antenna 1308 for example. A side of the device 1300 may include one or more microphones as well as at least one communication port 1314 such as a USB port as described herein.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

In an example 1, a method of image processing comprises receiving image data transmissions of frames of a video sequence in intervals and using universal serial bus (USB) protocol; and receiving non-data transmissions between transmissions of consecutive frames and having content arranged to indicate no image data is being transmitted and that does not trigger awakening out of a current low power state of at least a processor to perform the processing of a next frame of the video sequence.

In an example 2, the subject matter of example 1 wherein the non-data transmission is a not acknowledge (NAK) transmission.

In example 3, the subject matter of example 2 wherein the NAK transmission is also used to indicate data not accepted and to retransmit data at times other than between transmissions of consecutive frames.

In example 4, the subject matter of any one of examples 1 to 3 wherein the non-data transmission is received instead of receiving image data transmissions with zero bytes of image data.

In example 5, the subject matter of any one of examples 1 to 4 wherein the method comprises setting a device isochronous interrupt handler setting of a USB protocol kit to send NAK transmissions when no data exists to send.

In example 6, the subject matter of examples 1 to 5 wherein the method comprises having available power stages of a package having the processor, and available at least partly due to the use of the non-data transmissions and including PC3, PC6, PC8, and PC10 as available package c-state power stages.

In example 7, the subject matter of any one of examples 1 to 6 wherein a package having the processor is arranged to sleep in a non-active power stage of PC3 or deeper up to 30 milliseconds with the image data being provided at 720p resolution and 30 fps.

In example 8, the subject matter of any one of examples 1 to 7 wherein the method comprises having available power states of a central processing unit (CPU) and due at least partly to the use of the non-data transmissions and including core c-states CC3 to CC6 as available low power states.

In example 9, the subject matter of any one of examples 1 to 8 wherein the non-data transmissions are received between multiple pairs of consecutive frames and the pairs are not consecutive within the video sequence.

In example 10, a system of image processing comprises a camera to capture image data of frames of a video sequence; memory storing at least the image data; host controller circuitry communicatively coupled to the camera; and processor circuitry forming at least one processor to perform the processing of a next frame of the video sequence and communicatively coupled to the host controller circuitry and the memory, the host controller circuitry being arranged to operate by: receiving image data transmissions of frames of a video sequence in intervals and using universal serial bus (USB) protocol; and receiving non-data transmissions from the camera between transmissions of consecutive frames and having content arranged to indicate no image data is being transmitted and that does not trigger awakening out of a current low power state of the at least one processor.

In example 11, the subject matter of claim 10 wherein the non-data transmissions are no acknowledgement (NAK) transmissions received during an isochronous USB mode, and wherein the host controller circuitry is arranged to omit awakening of multiple subsystems of a system on a chip (SoC).

In example 12, a camera comprises at least one USB camera providing transmissions of frames of a video sequence; host controller circuitry forming at least one host controller communicatively coupled to the at least one USB camera to receive the transmissions from the USB camera; processor circuitry forming at least one processor to process a next frame of the video sequence and being communicatively coupled to the host controller, the host controller being arranged to operate by: receiving image data transmissions of frames of a video sequence in intervals and using universal serial bus (USB) protocol; and receiving non-data transmissions between transmissions of consecutive frames and having content arranged to indicate no image data is being transmitted and that does not trigger awakening out of a current low power state of at least a processor to perform the processing of a next frame of the video sequence.

In example 13, the subject matter of example 12 wherein at least one low power state of at least one component of a computing device including the at least one processor and the at least one host controller is entered depending on an idle duration so far at least partly resulting from the use of the non-data transmissions.

In example 14, at least one non-transitory article comprises at least one computer-readable medium having stored thereon instructions that when executed, cause a computing device to operate by: receiving image data transmissions of frames of a video sequence in intervals and using universal serial bus (USB) protocol; and receiving non-data transmissions between transmissions of consecutive frames and having content arranged to indicate no image data is being transmitted and that does not trigger awakening out of a current low power state of at least a processor to perform the processing of a next frame of the video sequence.

In example 15, the subject matter of example 14 wherein the non-data transmission is a no acknowledgement (NAK) transmission.

In example 16, the subject matter of example 14 or 15 wherein the processor is on a system-on-a-chip (SoC) and instructions cause the host controller to permit a processor subsystem to be placed in a lower power state.

In example 17, the subject matter of any one of examples 14 to 16 wherein the processor is on a system-on-a-chip (SoC) and instructions cause the host controller to permit the host controller to be placed in a lower power state.

In example 18, the subject matter of any one of examples 14 to 17 wherein the processor is on a system-on-a-chip (SoC) and instructions cause the host controller to permit a dynamic random access memory (DRAM) subsystem to be placed in a lower power state.

In example 19, the subject matter of any one of examples 14 to 18 wherein the instructions cause the host controller to initiate suspension of a USB protocol bus that is to provide data among subsystems on a processing device.

In example 20, the subject matter of any one of examples 14 to 19 wherein the instructions cause the host controller to initiate selective suspension of one or more ports less than all ports in data communication with a USB protocol bus.

In example 21, at least one machine readable medium includes a plurality of instructions that in response to being executed on a computing device, cause the computing device to perform a method according to any one of the above implementations.

In example 22, an apparatus may include means for performing a method according to any one of the above implementations.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A method comprising:

activating a power savings mode of a universal serial bus (USB) camera to cause the USB camera to switch from empty data transmissions to negative acknowledgement (NAK) transmissions to respond to data requests from a compute device when there is no image data for the USB camera to transmit, the data requests according to an isochronous mode of a USB protocol;

receiving, based on the data requests, image data transmissions associated with frames of a video from the USB camera at intervals based on the USB protocol; and receiving, based on the data requests, the NAK transmissions between the image data transmissions associated with consecutive frames of the video without triggering an awakening from an enabled low power state of the compute device.

2. The method of claim 1, wherein the activating of the power savings mode includes setting a device isochronous interrupt handler setting of a USB protocol kit of the USB camera to cause the USB camera to send the NAK transmissions when there is no image data exists to send.

3. The method of claim 1, wherein the compute device has package power states of PC0 to PC10, the PC0 state corresponds to an active power state, the PC1 state to PC10 states correspond to low power states, and the enabled low power state is one of the PC3 state, the PC6 state, the PC8 state, or the PC10 state.

4. The method of claim 1, wherein the power savings mode of the USB camera is to cause the compute device to remain in the PC3 state or a deeper package power state for up to 30 milliseconds with the image data provided by the USB camera at 720p resolution and 30 frames-per-second (fps).

5. The method of claim 1, wherein the compute device has core power states of CC0 to CC6, the CC0 state corresponds to an active power state, the CC1 to CC6 states correspond to low power states, and the enabled low power state is one of the CC3 to CC6 states.

6. The method of claim 1, including detecting power consumption of the compute device, wherein the activating of the power savings mode of the USB camera is based on the detected power consumption.

7. The method of claim 1, wherein the activating of the power savings mode of the USB camera is based on a setup parameter.

8. The method of claim 1, wherein the activating of the power savings mode of the USB camera is based on a detected condition of the compute device.

9. A system comprising:

a universal serial bus (USB) camera; and a compute device including:

memory;

instructions;

at least one processor circuit to be programmed based on the instructions to activate a power savings mode of the USB camera, the power savings mode to cause the USB camera to switch from empty data responses to negative acknowledgement (NAK) responses to respond to data requests from the compute device when there is no image data for the USB camera to transmit, the data requests according to an isochronous mode of a USB protocol; and a USB host controller to:

receive image data responses associated with frames of a video from the USB camera at intervals based on the USB protocol, the image data responses based on the data requests; and receive the NAK responses from the camera between the image data responses associated with consecutive frames of the video without triggering an awakening from an enabled low power state of the compute device, the NAK responses based on the data requests.

10. The system of claim 9, wherein one or more of the at least one processor circuit is to:

detect power consumption of the compute device; and activate the power savings mode of the USB camera based on the detected power consumption.

11. The system of claim 9, wherein one or more of the at least one processor circuit is to activate the power savings mode of the USB camera based on a setup parameter.

12. The system of claim 9, wherein one or more of the at least one processor circuit is to activate the power savings mode of the USB camera based on a detected condition of the compute device.

13. A compute device comprising:

memory;

instructions;

at least one processor circuit to be programmed based on the instructions to activate a power savings mode of a universal serial bus (USB) camera, the power savings mode to cause the USB camera to switch from empty data transmissions to negative acknowledgement (NAK) transmissions to respond to data requests from the compute device when there is no image data for the USB camera to transmit, the data requests according to an isochronous mode of a USB protocol; and a USB host controller to:

receive image data transmissions associated with frames of a video from the USB camera at intervals based on the USB protocol, the image data transmissions based on the data requests; and receive the NAK transmissions between the image data transmissions of consecutive frames of the video without triggering an awakening from an enabled low power state of the compute device, the NAK transmissions based on the data requests.

14. The compute device of claim 13, wherein one or more of the at least one processor circuit is to:

detect power consumption of the compute device; and activate the power savings mode of the USB camera based on the detected power consumption.

15. The compute device of claim 13, wherein one or more of the at least one processor circuit is to activate the power savings mode of the USB camera based on a setup parameter.

16. The compute device of claim 13, wherein one or more of the at least one processor circuit is to activate the power savings mode of the USB camera based on a detected condition of the compute device.

17. At least one non-transitory article comprising instructions to cause a universal serial bus (USB) host controller of a compute device to at least:

activate a power savings mode of a USB camera to cause the USB camera to switch from empty data transmissions to negative acknowledgement (NAK) transmissions to respond to data requests from a compute device when there is no image data for the USB camera to transmit, the data requests according to an isochronous mode of a USB protocol;

receive image data transmissions associated with frames of a video from the USB camera at intervals and based on the USB protocol, the image data transmissions based on the data requests; and receive the NAK transmissions between the image data transmissions of consecutive frames of the video without triggering an awakening from an enabled low power state the compute device, the NAK transmissions based on the data requests.

18. The at least one non-transitory article of claim 17, wherein the instructions are to cause the USB host controller to activate the power savings mode of the USB camera based on detected power consumption of the compute device.

19. The at least one non-transitory article of claim 17, wherein the instructions are to cause the USB host controller to activate the power savings mode of the USB camera based on a setup parameter.

20. The at least one non-transitory article of claim 17, wherein the instructions are to cause the USB host controller to activate the power savings mode of the USB camera based on a detected condition of the compute device.

* * * * *